United States Patent Office 3,281,506
Patented Oct. 25, 1966

1

3,281,506
SECONDARY PHOSPHITES AND PROCESS FOR MANUFACTURE THEREOF
Alvin F. Shepard and Bobby F. Dannels, Grand Island, N.Y., assignors to Hooker Chemical Corporation, Niagara Falls, N.Y., a corporation of New York
No Drawing. Filed Aug. 31, 1962, Ser. No. 220,898
10 Claims. (Cl. 260—960)

This invention relates to novel organo-phosphorus compounds and a process for preparing same. More specifically, this invention relates to novel secondary aryl phosphites and the process for preparing them.

The secondary aryl phosphites of this invention have the general formula:

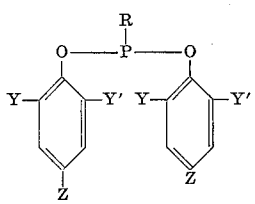

wherein R is selected from the group consisting of a hydroxyl and halogen radicals, Y and Y' are organic radicals containing at least four carbon atoms, and Z is selected from the group consisting of hydrogen, a halogen and an organic radical.

The secondary aryl phosphites of this invention may be used an antioxidants, stabilizers, plasticizers, gasoline or lubricating oil additives, flame-retarding agents and the like.

Secondary aryl phosphites of the art are too unstable to moisture to permit their general usage. Unless products containing them are carefully guarded against moisture, these phosphites hydrolyze yielding phosphorous acid and the parent phenol or phenols. The phosphorous acid set free is usually objectionable because of its tendency to attack metals, the skin, or clothing with which it may come into contact. Free phosphorous acid is also a health hazard, since it decomposes on mild heating to form the highly poisonous gas phosphine. The phenols liberated on hydrolysis of the phosphites are likewise undesirable because of their unpleasant "carbolic acid" odor and their tendency to discolor on standing.

It is an object of this invention to provide novel organo-phosphorus compounds.

A further object of this invention is to provide stable secondary aryl phosphites.

A still further object of this invention is a process for preparing stable secondary aryl phosphites.

These and other objects of this invention will become apparent from the following detailed description.

It has been found that by reacting phenols substituted in at least two of their positions with organic radicals containing at least four carbon atoms, with a phosphorus trihalide, under conditions which facilitate removal of halogen acid, a secondary aryl phosphoro-halidite is obtained which is then hydrolyzed to a stable secondary aryl phosphite.

The compounds of the invention are preferably prepared by reacting a di- or tri-substituted phenol with a phosphorus tri-halide in the presence of a tertiary amine, at room temperature. The tertiary amine, such as, triethylamine, facilitates the removal of halogen acid formed by the reaction, thus, increasing the rate of reaction. The tertiary amine can be used in either theoretical amounts or in slight excess, i.e., up to about 20% excess.

Other conditions which facilitate the removal of the halogen acid are:

2

(1) Use of other tertiary amines, such as, pyridine, quinoline or tributylamine;
(2) Addition of an insoluble basic substance, for example, lime; and
(3) Prolonged heating together of the phenol and the halide.

The substituted phenols, or their salts, which may be used in the invention are characterized by the following general formula:

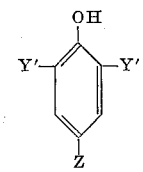

wherein Y and Y' are organic radicals, alkyl having from 4 to 12 carbon atoms and aralkyl having from 7 to 12 carbon atoms, containing at least four carbon atoms and Z is selected from the group consisting of hydrogen, a halogen and an organic radical, e.g., alkyl, and aralkyl having from 7 to 12 carbon atoms.

The substituted phenols which may be used in practicing the invention are characterized by the following formulas:

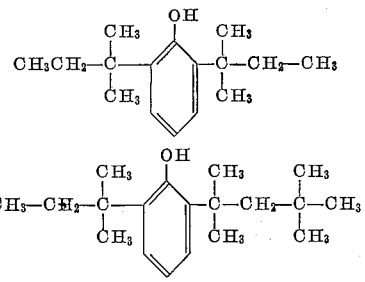

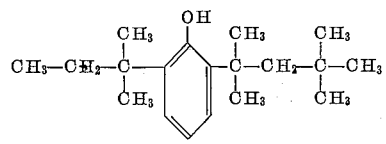

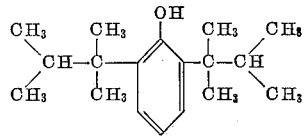

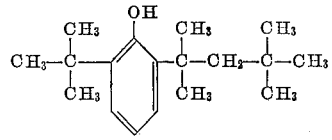

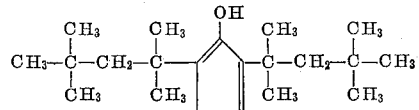

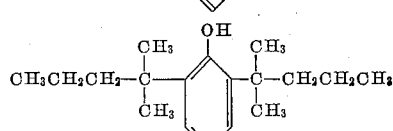

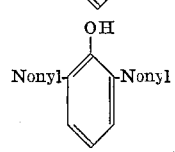

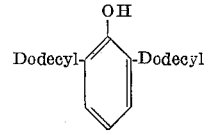

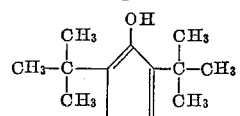

2,4,6-tri-t-butylphenol

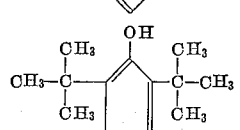

2,6-di-t-butyl-4-methylphenol

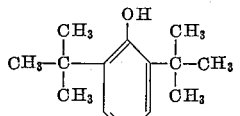

2,6-di-t-butyl-4-nonylphenol

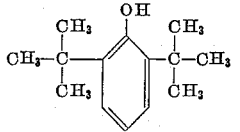

2,6-di-t-butyl-4-chlorophenol

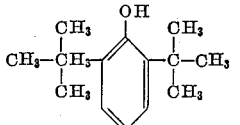

Tri(phenylethyl)phenol

It has been found that phenols substituted in the 2,6- and 2,4,6-position give products, when used as reactants in the process of the invention, of high stability to hydrolysis. It has been further found that the products of the tri-substituted phenols are more stable than the products of the di-substituted phenols.

The temperature and pressure at which the reaction of this invention is carried out are dictated largely by convenience and depend upon the boiling point of the phosphorus trihalide used. Thus, the boiling point of phosphorus trichloride is 76 degrees centigrade and to react this composition much above 76 degrees centigrade would require pressure equipment. However, subatmospheric and superatmospheric pressures can be used if desired. Higher temperatures can be used as the boiling point of phosphorus trichloride is raised when higher boiling point reactants are added.

The reaction is controlled as to the phosphite obtained by the ratio of reactants used. Thus, it is preferred to use a molar excess of substituted phenol or at least about two moles of substituted phenol per mole of phosphorus trihalide.

The phosphorus trihalide may be phosphorus trichloride, phosphorus triiodide, phosphorus tribromide and phosphorus trifluoride. It is preferred for purposes of this invention, however, to use phosphorus trichloride. Other halides which may be used in this process are the halides of antimony, arsenic, silicon and boron.

The reaction is completed when, in the presence of a tertiary amine, a precipitate no longer continues to form. Another way to test for completion of the reaction is to test for the halide and determine that the evolution of halogen acid is completed.

In the process as described herein, phosphorochloridites are formed. Some cannot be readily hydrolyzed to their corresponding secondary phosphites and are recovered as such.

It has been found that the 2,4,6-tri-substituted alkyl phenols produce secondary aryl phosphites which possess greater stability than the 2,6-di-substituted secondary aryl phosphites. Table I illustrates the relative stability of the products of this invention.

TABLE I

| Compound | Percent Hydrolyzed to H$_3$PO$_3$ in Time Indicated by Boiling With— | | |
|---|---|---|---|
| | H$_2$O | 0.05 N NaOH | 0.05 N HCl |
| Triphenyl phosphite | 50%—50 min | 50%—50 min | |
| Trilauryl phosphite | 50%—110 min | | |
| 2,6-di-t-butylphenyl phosphite | 50%—180 min | 50%—120 min | 50%—180 min. |
| 2,4,6-tri-t-butylphenyl phosphite | 0%—41 hrs | 48%—22 hrs | 0%—50 hrs. |
| 2,6-di-t-butyl-4-methylphenyl phosphite | 32%—24 hrs | 36%—2 hrs | 28%—60 hrs. |
| 2,6-di-t-butyl-4-chlorophenyl phosphite | 25%—8 hrs | | |
| Bis-2,6-di-t-butylphenyl phosphite | 0%—70 hrs | | |
| Bis-2,6-di-t-butyl-4-methylphenylphosphorochloridite | 12%—46 hrs.[1] | 0%—24 hrs | |
| Bis-2,6-di-t-butyl-4-chlorophenylphosphorochloridite | 48%—72 hrs.[1] | | 5%—48 hrs.[1] |
| Bis-2,4,6-tri-t-butylphenyl phosphorochloridite | 1%—48 hrs.[1] | 0%—101 hrs | |

[1] In these cases, titration of products showed the presence of strong acid only. No weakly acid hydrogen could be detected. From this it is inferred that these hydrolyses involved mainly formation of HCl and not complete hydrolysis to H$_3$PO$_3$, which contains one weakly acid H.

Triphenyl phosphite and trilauryl phosphite are used as standards. This is done because the unsubstituted secondary phosphites such as (C$_6$H$_5$O)$_2$POH are so difficult to isolate and keep, and it is justified by the fact that (C$_6$H$_5$O)$_2$POH must be an intermediate in the hydrolysis of phenyl phosphite. Thus, it is apparent that a comparison with (C$_6$H$_5$O)$_2$POH would have shown the secondary phosphites of the present invention to even greater advantage. Note should be made of the fact that the phosphorochloridites are very stable intermediates.

The following examples are presented to illustrate the invention more fully without any intent to limit the invention thereby.

*Example 1.—Preparation of bis-2,6-di-t-butylphenyl phosphite*

To a mixture of 103 g. (0.5 m.) 2,6-di-t-butylphenol and 55.5 g. (C$_2$H$_5$)$_3$N (0.55 m.) there was added a 16.7 g.

(0.167 m.) PCl₃ dropwise over a 45-minute period at 45° C. The mixture was then heated at 85–90° C. for 3.5 hours. Water (50 cc.) was added and the resulting mixture was extracted with n-hexane. After stripping of the solvent and unreacted phenol, 28 g. remained. The product, M.P. 147–149° C., was obtained from this residue by crystallization from acetone and from hexane.

*Analysis.*—Calcd. for 2,6-di-t-butyl-diphenyl phosphite: C, 73.3%; H, 9.37%; P, 6.79%; Cl, 0%. Found: C, 73.6%; H, 9.9%; P, 6.8%; Cl, 0%.

*Example 2.—Preparation of bis-2,6-di-t-butyl-4-methylphenyl phosphorochloridite*

There was placed in a flask, from which moisture was excluded, 112 g. of 2,6-di-t-butyl-4-methyl phenol and 117 g. of triethylamine. After heating to 75° C., at which temperature the phenol was dissolved, 20.5 g. of PCl₃ was added dropwise over a 1½-hour period. The reaction mixture was then heated at 111–113° C., for 19 hours. Upon cooling, 156 g. of petroleum ether was added to help break up the solids, which were then filtered off and washed with additional solvent. The filtrate and wash were combined and the low boiling material stripped off under vacuum, (unreacted phenol was removed at this point). The residue, which weighed 58 g. was ground up and treated with 1 l. 5% NaOH. The solid was then filtered and washed with water. After recrystallization from acetone, it melted at 113–115° C. This compound was neutral and had the following analysis: C, 71.5%; H, 9.2%; P, 6.38%; Cl, 6.2%—calcd. for C₃₀H₄₆O₂ClP: C, 71.4%; H, 9.12%; P. 6.15%; Cl, 7.04%.

*Example 3.—Preparation of bis-2,6-di-t-butyl-4-methylphenyl phosphite*

A mixture of 10 g. of the product of Example 2 and 500 cc. 0.1 N HCl was refluxed in an inert atmosphere for 24 days. The solid was then filtered off and washed with water until free of chloride ion. Upon drying, it melted at 161–163° C. Recrystallization from n-hexane did not appreciably change the melt point. The product was neutral and had the following analysis: Cl, <.02%; P, 6.7% (calcd.—Cl, 0%; P, 6.4%).

*Example 4.—Preparation of bis-2,6-di-t-butyl-4-chlorophenyl phosphorochloridite*

A solution 72.1 g. of 2,6-di-t-butyl-4-chlorophenol in 38 g. of triethylamine was slowly added to 427 g. of PCl₃ at 17–19° C. An additional 106 g. of the phenol was then slowly added as a solid. After standing overnight, the mixture was heated at 78–79° C. for 5.5 hours. The phosphorodichloridite was distilled off at 156–166° C./2.6 mm. The phosphoromonochloridite was washed with water and then dissolved in 700 cc. of acetone. The addition of 50 cc. H₂O precipitated a colorless crystalline solid which, after additional washing with water and drying, melted at 147–148.5° C. The material was neutral and had the following analysis: Cl, 19.0%; P, 5.5%—calcd. Cl, 19.5%; P, 5.68%.

*Example 5.—Preparation of bis-2,4,6-tri-t-butylphenyl phosphorochloridite*

To a mixture of 576 g. of 2,4,6-tri-t-butylphenol and 252 g. of triethyl amine in an inert atmosphere there was added dropwise over a 2-hour period 135 g. of PCl₃ at 25–40° C. The temperature was slowly raised and the mixture heated at 115° C. for 16.5 hours. The temperature was further increased to 150° C., and maintained here for an additional 24 hours. After cooling, the reaction mixture was thoroughly washed with water in a blender. The solids were then extracted with hot ethanol, unreacted phenol passing into the extract. They were then washed with 2 l. of 5% NaOH and then with water until the wash was neutral. After drying, 438 g. remained. This had a melting point of 171.5–173.5° C.

The product can be further purified by recrystallization from hexane, after which it melts at 173–174° C. It has the following analysis: C, 73.3%; H, 9.9%; P, 5.4%; Cl, 5.4%—calcd. for C₃₆H₅₈O₂ClP: C, 73.35%; H, 9.92%; P, 5.27%; Cl, 6.02%.

*Example 6.—Acid acceptor omitted*

Example 1 was repeated. From 0.5 mol 2,6-di-t-butylphenol and 0.167 mol PCl₃, 28 gm. of crude secondary phosphite was obtained. This amount of crude secondary phosphite corresponds to the liberation of 0.116 mol HCl in the heating step. When this experiment was repeated with triethyl amine omitted, only 0.03 moles of HCl were set free, thus, illustrating the use of the acid acceptor increases the rate of reaction.

We claim:
1. The composition having the general formula:

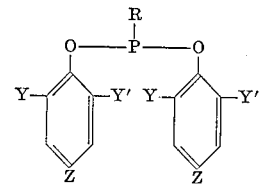

wherein R is selected from the group consisting of hydroxyl and halogen; Y and Y' are selected from the group consisting of alkyl having from 4 to 12 carbon atoms and aralkyl having from 7 to 12 carbon atoms; and Z is selected from the group consisting of hydrogen, a halogen and an alkyl, and aralkyl having from 7 to 12 carbon atoms.

2. Bis-(2,6-di-t-butylphenyl) phosphite.
3. Bis-(2,4,6-tri-t-butylphenyl) phosphite.
4. Bis-(2,6-di-t-butyl-4-methylphenyl) phosphite.
5. Bis-(di-t-butyl-4-chlorophenyl) phosphorochloridite.
6. A process for preparing

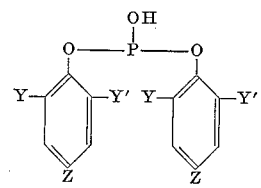

wherein Y and Y' are independently selected from the group consisting of alkyl having from 4 to about 12 carbon atoms and aralkyl having from 7 to about 12 carbon atoms and Z is selected from the group consisting of hydrogen, halogen, alkyl, and aralkyl having from 7 to 12 carbon atoms, comprising reacting a phenolic compound having the formula

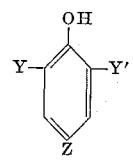

wherein Y, Y' and Z are as above defined, with a phosphorus trihalide, in the presence of an acceptor for halogen acid, thereby preventing the accumulation of such acid in the reaction mixture, to produce a phosphorohalidite, and hydrolyzing the phosphorohalidite to a corresponding aryl phosphite.

7. The process of claim 6 wherein the phenolic compound is 2,6-tertiary-butyl phenol.
8. The process of claim 6 wherein the phenolic compound is 2,6-tertiary butyl-4-methyl phenol.
9. The process of claim 6 wherein the phenolic compound is 2,6-tertiary butyl-4-chlorophenol.

10. A process for preparing

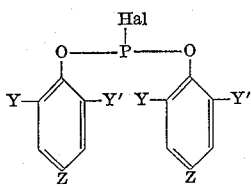

wherein Hal is a halogen, Y and Y' are independently selected from the group consisting of alkyl having from 4 to about 12 carbon atoms and aralkyl having from 7 to about 12 carbon atoms and Z is selected from the group consisting of hydrogen, halogen, alkyl, and aralkyl having from 7 to 12 carbon atoms, comprising reacting a phenolic compound having the formula

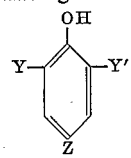

wherein Y, Y' and Z are as above defined, with a phosphorus trihalide, in the presence of an acceptor for halogen acid, thereby preventing the accumulation of such acid in the reaction mixture, to produce a phosphorohalidite.

References Cited by the Examiner
UNITED STATES PATENTS

| | | | |
|---|---|---|---|
| 2,275,041 | 3/1942 | Britton et al. | 260—461.311 |
| 2,397,702 | 4/1946 | Smith et al. | 252—32.7 |
| 2,419,354 | 4/1947 | Howland et al. | 260—461.315 XR |
| 2,432,095 | 12/1947 | Frey | 260—461.315 |
| 2,903,346 | 9/1958 | Coffield | 260—461.305 XR |
| 2,911,431 | 11/1959 | Orloff et al. | 260—461.312 |
| 3,012,057 | 12/1961 | Fierce et al. | 260—46.311 |
| 3,019,249 | 1/1962 | Gunderloy | 260—461.315 |
| 3,053,878 | 9/1962 | Friedman et al. | 260—461.315 |

OTHER REFERENCES

Stillson et al.: "J. Am. Chem. Soc.," vol. 67, pp. 303–307 (1945).

CHARLES B. PARKER, *Primary Examiner.*

MORRIS LIEBMAN, IRVING MARCUS,
*Examiners.*

FRANK M. SIKORA, DELBERT R. PHILLIPS,
*Assistant Examiners.*

UNITED STATES PATENT OFFICE
CERTIFICATE OF CORRECTION

Patent No. 3,281,506                                 October 25, 1966

Alvin F. Shepard et al.

It is hereby certified that error appears in the above numbered patent requiring correction and that the said Letters Patent should read as corrected below.

Column 3, lines 58 to 70, the formula should appear as shown below instead of as in the patent:

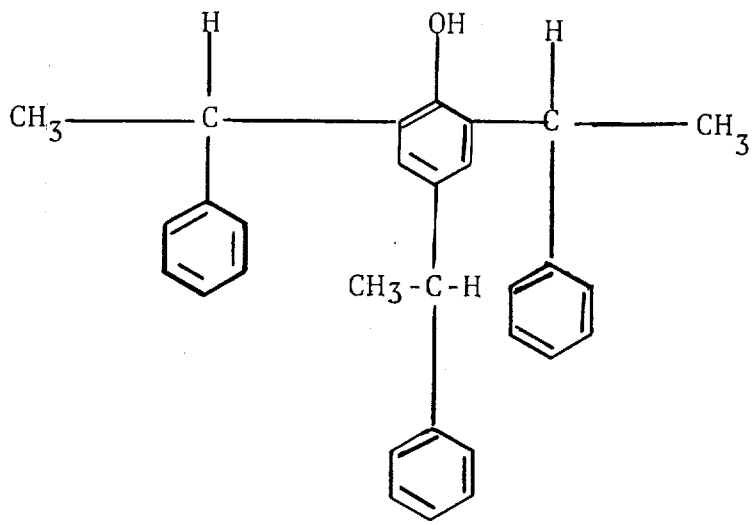

Signed and sealed this 7th day of November 1967.

(SEAL)
Attest:

EDWARD M. FLETCHER, JR.                         EDWARD J. BRENNER
Attesting Officer                                      Commissioner of Patents